(12) United States Patent
Nilson

(10) Patent No.: US 7,182,031 B2
(45) Date of Patent: Feb. 27, 2007

(54) CONVERSION KIT FOR ALL TERRAIN VEHICLE

(75) Inventor: Mait Nilson, Tallinn (EE)

(73) Assignee: OU Turundusteave, Tallinn (EE)

( * ) Notice: Subject to any disclaimer, the term of this patent is extended or adjusted under 35 U.S.C. 154(b) by 0 days.

(21) Appl. No.: 11/097,203

(22) Filed: Apr. 4, 2005

(65) Prior Publication Data

US 2005/0221693 A1    Oct. 6, 2005

Related U.S. Application Data

(60) Provisional application No. 60/558,583, filed on Apr. 2, 2004.

(51) Int. Cl.
*B63B 43/14* (2006.01)

(52) U.S. Cl. ..................... 114/123; 440/12.5

(58) Field of Classification Search .............. 114/61.1, 114/123; 440/12.5
See application file for complete search history.

(56) References Cited

U.S. PATENT DOCUMENTS

| | | | | |
|---|---|---|---|---|
| 3,321,784 | A | * 5/1967 | Rasmussen | 114/343 |
| 4,441,445 | A | * 4/1984 | De Weck | 114/61.11 |
| 4,494,937 | A | 1/1985 | Riermann | |
| 4,516,943 | A | * 5/1985 | Spieldiener et al. | 441/35 |
| 4,593,640 | A | * 6/1986 | Blunschi | 114/123 |
| 4,597,353 | A | 7/1986 | Takezono | |
| 4,744,324 | A | 5/1988 | Martinmaas | |
| 4,843,992 | A | * 7/1989 | Babikian | 114/69 |
| 5,868,091 | A | * 2/1999 | Gross et al. | 114/61.1 |
| 6,305,306 | B1 | * 10/2001 | Grzybowski | 114/123 |
| 6,749,471 | B1 | * 6/2004 | Deverell | 440/11 |

* cited by examiner

*Primary Examiner*—Stephen Avila
(74) *Attorney, Agent, or Firm*—Young & Thompson

(57) ABSTRACT

The invention offers a conversion kit for all terrain vehicle, which is adjusted for driving both on the terrain and in the water. For that purpose, pontoons to lengthen the front and rear side of the all terrain vehicle have been constructed, the height whereof in respect of the vehicle in working position can be adjusted according to one's needs. The pontoons can be turned in such position that does not disturb the movement of the all terrain vehicle on dry land.

3 Claims, 5 Drawing Sheets

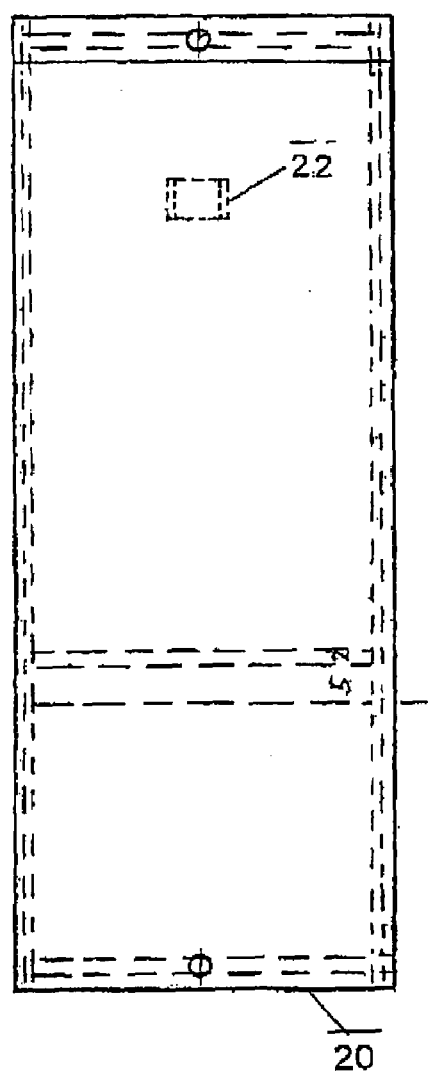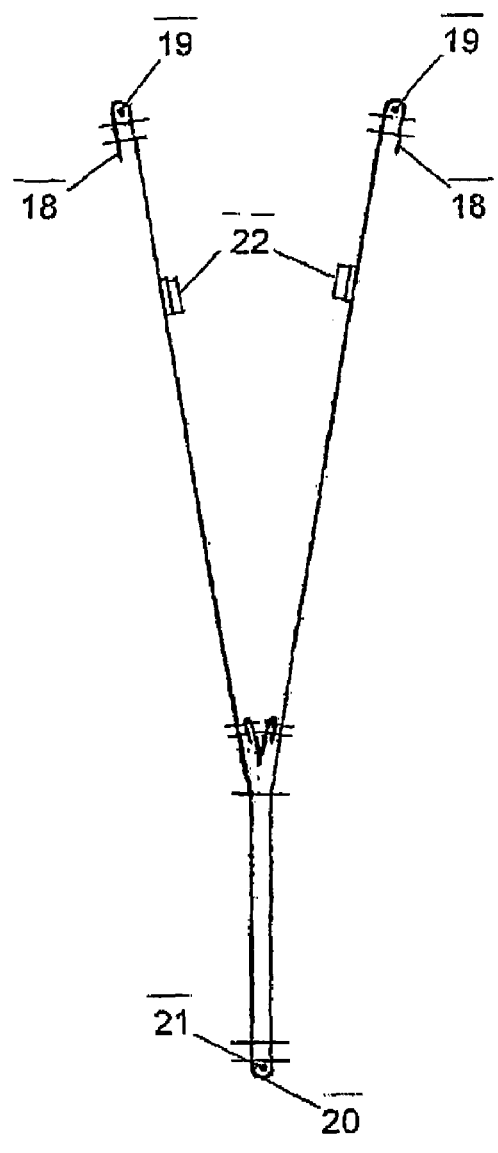
FIG 4A                    FIG 4B

CONVERSION KIT FOR ALL TERRAIN VEHICLE

FIELD OF THE INVENTION

This invention is related to all terrain vehicle (ATV), which has been adjusted for driving both on the terrain and in the water. The invention is related specifically to a conversion kit for universally constructed all terrain vehicle and has been intended for mounting onto different types of all terrain vehicles in order to guarantee the floatage of the vehicle.

BACKGROUND ART

All terrain vehicles have gained popularity and are used both in business in order to move on the hardly penetrable terrain and to spend one's free time. The all terrain vehicles usually have at least three wheels and a handle to rotate the wheel or pair of wheels in front. The wide specially patterned fires and appropriate transmission make it possible to permeate very different terrains including sand, soil, mud, snow, ice, etc. The only imperfection of a traditional all terrain vehicles is that although they can be used to go through shallow water, they lack the ability to float, and therefore they cannot be used to drive through the deeper water. In order to eliminate this deficiency, several solutions have been proposed.

U.S. Pat. No. 4,744,324 offers a solution for converting an all terrain vehicle into an amphibian. For that purpose, extensions of driving axle have been fixed onto the outer side of each rear wheel of the all terrain vehicle. Additional wheels have been fixed on the extensions with specially designed paddles in between in order to stabilize moving in the water.

U.S. Pat. No. 4,494,937 describes a pontoon floatation device which can be fixed onto the all terrain vehicle. The pontoons can be moved vertically, and their height in regards to the vehicle can be adjusted when driving into the water, while in the water and emerging from the water. Between the pontoons at the back of the vehicle there are rotating paddles powered by the engine of the all terrain vehicle to facilitate moving in the water.

All terrain vehicles adjusted for driving in the water are generally well-known for their high technical standard. However, they still have several shortcomings. The pontoons intended for ensuring floating have been mounted on the sides of the vehicle. The deficiency of this solution is the increase of the width of the vehicle, which hinders moving on the terrain with limited penetrability. Navigability and driving safety are deteriorated as well. In order to continue the travel after emerging from water and heading onto the wooded path with limited width, in case of such solutions known for their high technical standard, the pontoons should be demounted off the all terrain vehicle. The existing solutions do not offer any appropriate space on the vehicle for holding the floaters. Therefore, the pontoons should be kept separately, which does not enable mobile movement of the user.

SUMMARY

The objective of the present invention is to provide a set of universally constructed, easily and quickly adjustable and favourably priced pontoons, which do not increase the general width of the vehicle. In order to gain this objective, pontoons to lengthen the front and rear side of the vehicle have been constructed, the height of which can be adjusted in the working position according to one's needs. In addition, the pontoons can be brought into such position where the pontoons are drained from air and the frame turned completely on the luggage rack in the position not disturbing movement of the vehicle on the dry land. In the construction of the invention, elements of a standard all terrain vehicle are used to the maximum extent in order to minimize the number of the elements of the pontoons set. As a result, a set of optimum constructed, quickly adjustable and favourably priced pontoons are provided.

BRIEF DESCRIPTION OF THE DRAWINGS

All the above mentioned as well as other features of the present invention can easily be understood with the help of the following description, claims and accompanying drawings where:

FIG. 4A illustrates front view of a preferred embodiment of the pontoon bag according to the present invention;

FIG. 4B illustrates side view of FIG. 4A;

DETAILED DESCRIPTION OF THE INVENTION

Figure 1:
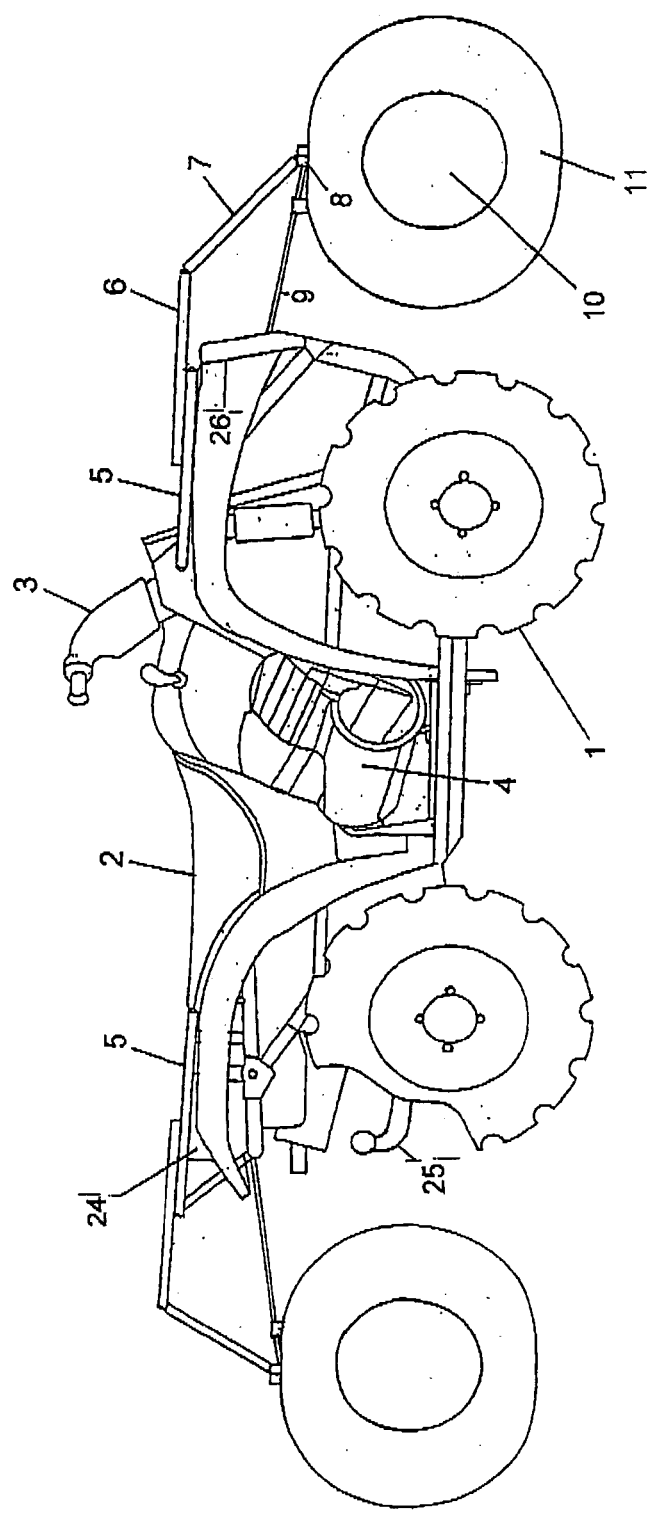
FIG. 1 illustrates general view of a preferred embodiment of the present invention with the pontoons in the working position.
Figure 2:
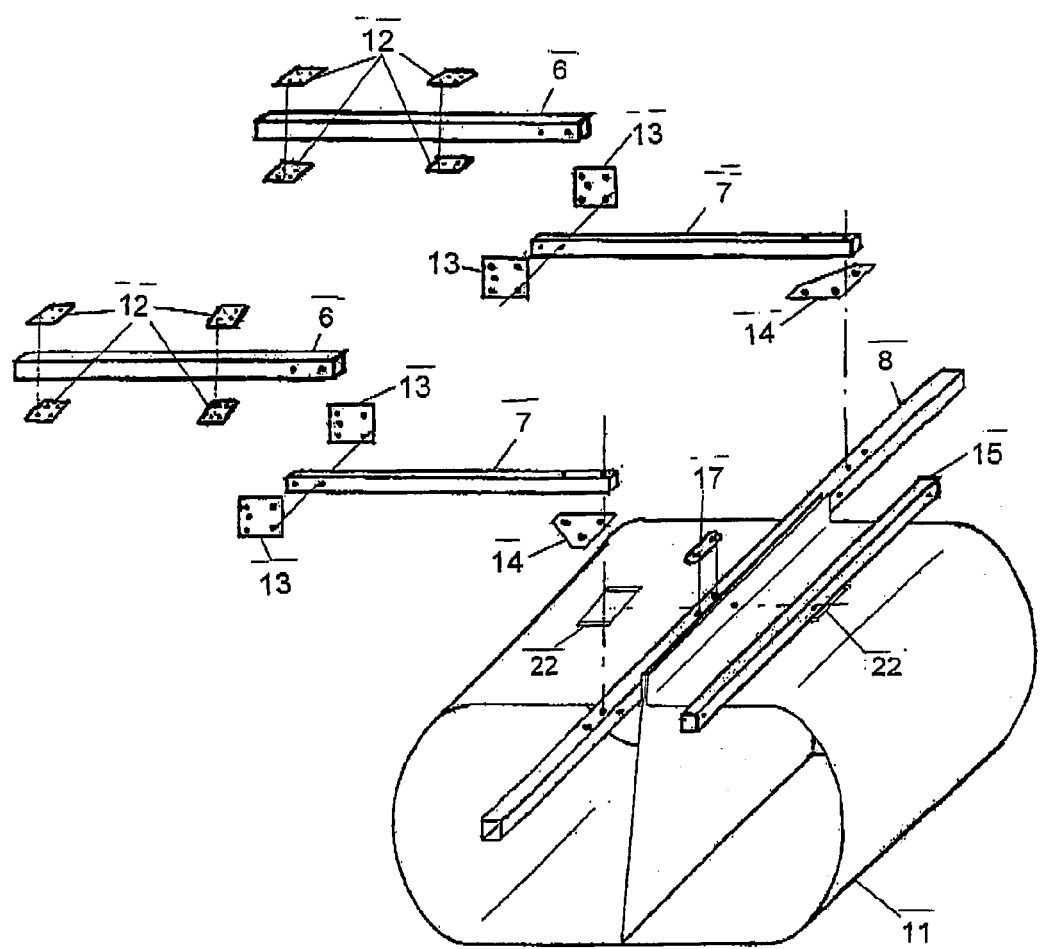
FIG. 2 illustrates exploded view of the preferred embodiment of the set of pontoons according to the present invention.
Figure 3:
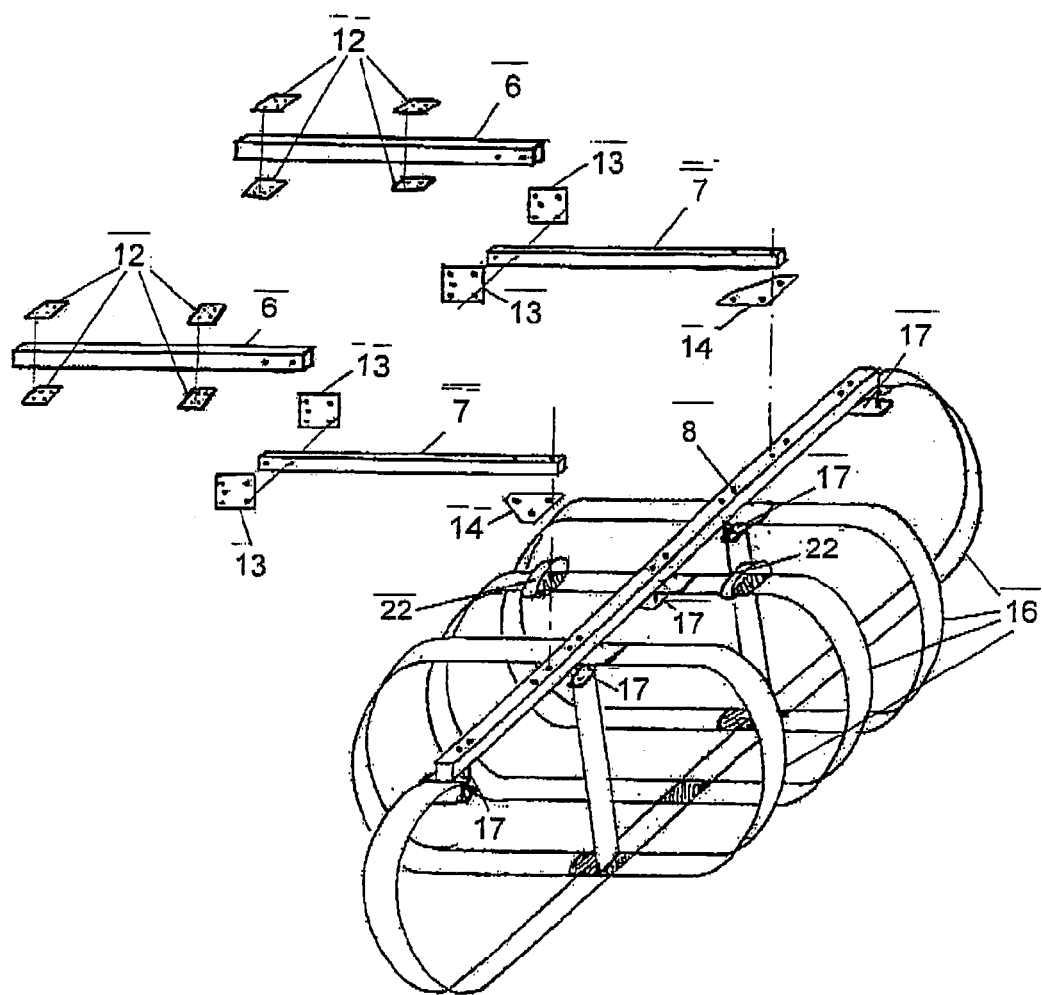
FIG. 3 illustrates exploded view of another favourable embodiment of the set of pontoons according to the present invention.

In FIG. 1, there is a general view of an all terrain vehicle, which has at least three wheels 1, a seat 2, steering and control mechanism 3 and an engine 4, provided with the conversion kit corresponding to the present invention. Traditional all terrain vehicles have a luggage rack 5 at the front and at the rear. In the preferred embodiment of the invention, there are two immobile frame-pipes 6 fixed onto the luggage rack 5. On the immobile frame-pipes 6, the frame of the pontoon, consisting of frame-pipe of the pontoon 7 and bearing-pipe of the pontoon 8 fixed to it, is mounted. In order to strengthen the joining attachment between the frame-pipe 7 and the bearing-pipe 8, there is a belt, a cable or a string 9 stretched between the bearing-pipe 8 and the luggage rack 5. The pontoon 10 is placed in the pontoon bag 11. In FIG. 2, there is a dismantle view of one of the preferred embodiment of the invention. The immobile frame-pipe 6 is between the fixing plates 12, which fix the immobile frame-pipe 6 onto the vehicle. The fixing plates 12 are fixed onto the front and rear luggage rack 5 with bolts (see FIG. 1). The immobile frame-pipe 6 can be moved lengthways the all terrain vehicle, if necessary, in order to adjust the position of the pontoon 10. The frame of the pontoon, which contains the frame-pipe of the pontoon 7, is mounted on the immobile frame-pipes 6 with articulated plates 13, and the bearing-pipe 8 of the pontoon is fixed onto the frame with brackets 14. The immobile frame-pipe 6 is fixed between the articulated plates 13 with a quick latch. The articulated plates 13 can be used to change and fix the slope of the frame-pipe 7 of the pontoon towards immobile frame-pipe 6. When driving on dry land, the frame of the pontoon is turned into a fixed position at a suitable height from the ground level, so that the pontoon 10 will not disturb the movement of the all terrain vehicle; or the pontoons are drained from air and the frame of the pontoon is turned completely onto the luggage rack 5. The pontoon 10 is placed in the pontoon bag 11, which according to the preferred embodiment of the invention is designed two-sectioned. This solution enables using a suitable size inner tube of the vehicle tyre as the pontoon 10 in the preferred embodiment. The pontoon bag 11 is fixed between the bearing-pipe of the pontoon 8 and the cross-fastening 15. In FIG. 3, there is a dismantle view of another preferred embodiment of the invention. The pontoon 10 is mounted onto the bearing-pipe of the pontoon 8 with belts 16, which are fixed onto the bearing-pipe of the pontoon 8 with cross-fastenings of the belt 17.

The pontoon bag 11 in FIG. 4A is made of non-stretching elastic material, in the preferred embodiment of waterproof tarpaulin. The material of the pontoon bag 11 is rectangular-shaped; the edges of the shorter sides 18 have been slightly turned back (see FIG. 4B). Strings 19, which length is equal to the shorter sides, are placed in the two tubes formed, and the edges have been sewn up along the side with seam. Then the material is folded lengthways the line 20 connecting the centre points of the two longer sides, and a string, which length is equal to the shorter side 21, is placed in the folding line and sewn up with the seam. Next, the folded material is sewn up with the seam, which length is equal to the shorter side 21, so that the seam is crosswise with the longer edge and at a distance from the central point of the longer edge. Then the material is folded once again so that the strings 19 and 21 are at the same line. The formed two-sectioned pontoon bag 11 is fixed between the bearing-pipe of the pontoon 8 and the cross-fastening 15 so that the strings 19 and 21 are on one side of the joining surface of the bearing-pipe of the pontoon 8 and the cross-fastening 15, and the pontoon bag 11 is on the other side of the joining surface. This excludes the edges of the pontoon bag 11 coming out from between the bearing-pipe of the pontoon 8 and the cross-fastening 15. The pontoon bag 11 has additional loops 22 for the belt 9 for fixing the working position of the pontoon 10.

Figure 5:
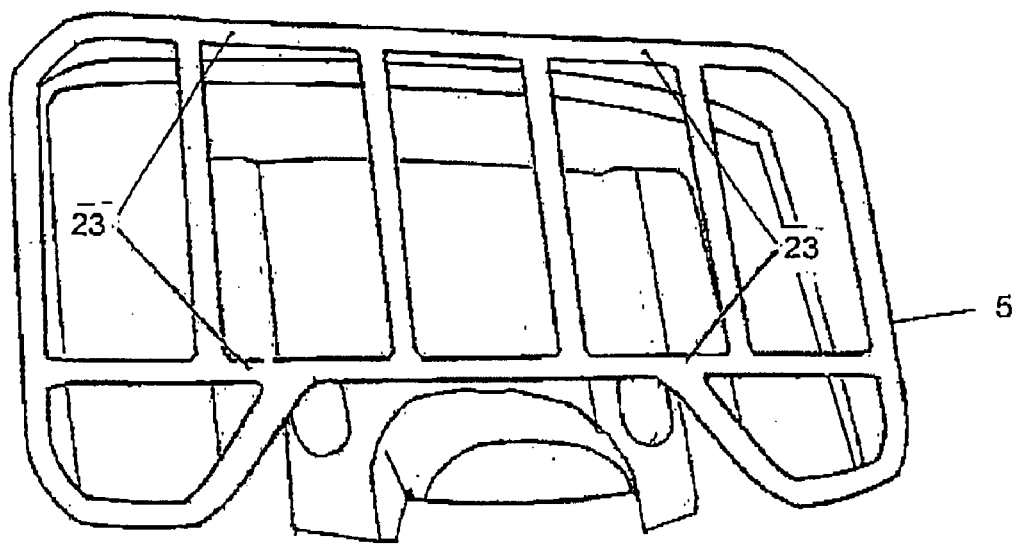
FIG. 5 illustrates top view of the luggage rack included in the set of a standard all terrain vehicle.

In FIG. 5, there is a luggage rack 5 included in the set of the all terrain vehicle (see also FIG. 1). The immobile frame-pipes 6 of the pontoon of the invention have been fixed onto suitable places of the pipes of the luggage rack (reference numbers 23 in FIG. 5).

The pontoon 10 can be placed in the pontoon bag 11 when drained or between the fastening belts 16. The pontoons 10 have been filled with air by using a pneumatic compressor. The set is equipped with pneumatic hoses (not shown in the figures) for leading the air into the pontoons 10.

For additional fixing of the working position of the pontoon 10 and the frame of the pontoon to all terrain vehicle, a belt, a cable or a string 9 is connected with one end to the bearing-pipe of the pontoon 8 (see FIG. 1). The other end of the belt, cable or string 9 is inserted through the loop 22 of the pontoon bag 11 and fixed onto the luggage rack 5. Thus the pontoon bag 11 and the frame of the pontoon are firmly fixed to the all terrain vehicle so that the turning of the frame of the pontoon in relation to immobile frame-pipe 6, and pontoon 10 in relation to the bearing-pipe of the pontoon 8 is avoided.

Above, the preferred embodiment of the invention was described. However, the invention allows several embodiments without departing the extent of the invention. The frame-pipe of the pontoon 7 with the fixed bearing-pipe of the pontoon 8 attached to it was placed above the pontoon 10 in the preferred embodiment. In case of alternative embodiments, the frame-pipe of the pontoon 7 with the fixed bearing-pipe of the pontoon 8 attached to it can be placed on one or both sides of the pontoon 10, beneath it, or at its ends. In another alternative embodiment, the immobile frame-pipe 6 and the frame-pipe of the pontoon 7 can be fixed rigidly to one another. In order to guarantee suitable positions for the pontoon 10 in this accomplishment, the immobile frame-pipe 6 can be rotated and fixated in respect of the vehicle. In the third alternative embodiment, a suitably sized pontoon 10 can be used in such way that the articulated plates 13 can be omitted and the frame-pipe of the pontoon 8 can be fixed to the immovable frame-pipe 6. In the fourth alternative embodiment, there are additional stretching belts fixed around or onto the pontoon bag 11 to provide better rigidity for the pontoon 10. Extra equipment set according to the invention can be used also for such all terrain vehicles that do not have either front or rear or both luggage racks 5. In that case the immobile frame-pipe 6 can be fixed onto the luggage rack 5 of the all terrain vehicle, onto the mounting of the winch 24, onto the trailer hook 25 of the all terrain vehicle or onto the front protection bumper 26 (see FIG. 1).

The invention claimed is:

1. Conversion kit for all terrain vehicle, having at least three wheels (1) arranged as front and rear wheels, a seat (2), a steering and control mechanism (3), an engine (4), flotation means including pontoons (10) for supporting the all terrain vehicle in water, wherein the conversion kit comprises at least one immobile frame-pipe (6) fixed onto the front and rear part of the all terrain vehicle and the frame of the pontoon connected thereto with an articulation, with pontoons (10) in pontoon bags (11) fixed to it, in such way that the positions of the pontoons can be adjusted and fixed in respect to the all terrain vehicle only forwardly and rearwardly, respectively, of the front and rear wheels.

2. The kit according to claim 1, wherein the pontoon (10) being only partially surrounded by the pontoon bag (11).

3. The kit according to claim 1, wherein said articulation mounts the pontoon for vertical swinging movement about a horizontal axes between a lowered deployed operative position and a raised inoperative position.

* * * * *